Aug. 2, 1949.  C. TROSPER  2,478,139
INDEXING MEANS FOR FABRIC LENGTH MARKERS
Filed Oct. 1, 1945  2 Sheets-Sheet 1
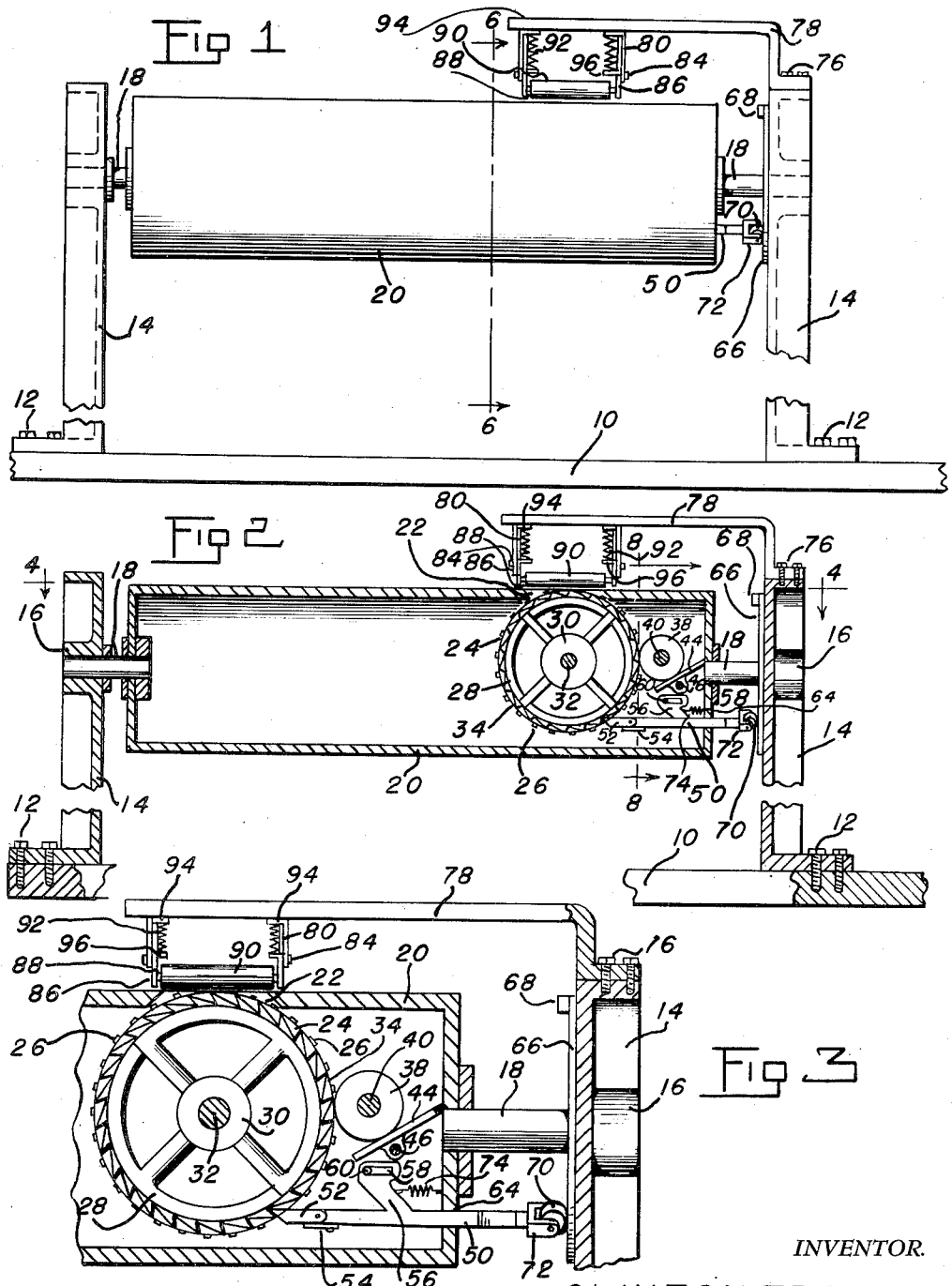
INVENTOR.
CLINTON TROSPER
BY Victor J. Evans & Co.
ATTORNEYS Aug. 2, 1949.　　　　C. TROSPER　　　　2,478,139
INDEXING MEANS FOR FABRIC LENGTH MARKERS
Filed Oct. 1, 1945　　　　　　　　　　2 Sheets-Sheet 2
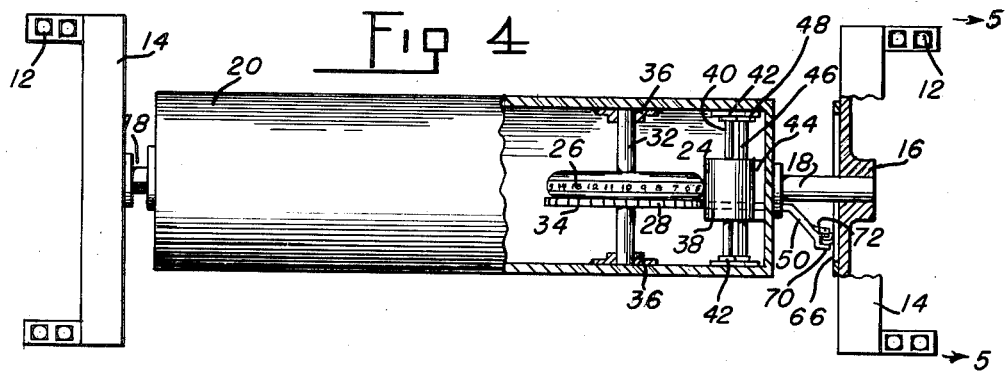
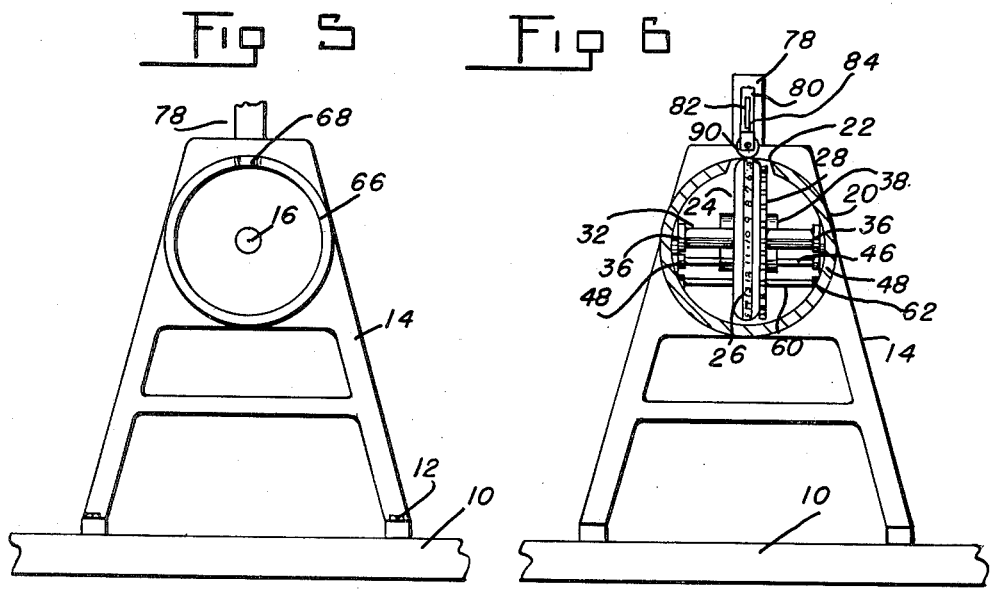
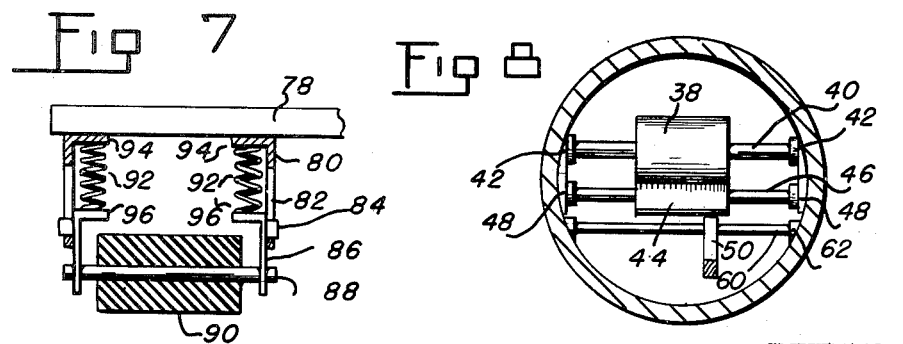
*INVENTOR.*
CLINTON TROSPER
BY *Victor J. Evans & Co.*
ATTORNEYS Patented Aug. 2, 1949

2,478,139

UNITED STATES PATENT OFFICE 2,478,139

INDEXING MEANS FOR FABRIC LENGTH MARKERS

Clinton Trosper, Topeka, Kans.

Application October 1, 1945, Serial No. 619,546

2 Claims. (Cl. 101—74)

This invention relates to an indicator to be used to indicate the amount in lineal and square yards in a bolt or roll or remaining in a bolt or roll of material such as carpet or linoleum or any type or kind of material that is packaged in this manner.

An object of this invention is to provide a device which will mark the roll so that an individual can tell at a glance the remaining yardage thereby furnishing him with a perpetual inventory.

Thus, the salesman eliminates the hazard of making mistakes, can tell if there is the amount desired on the roll for a sale and prevents damage to material occasioned by unrolling it and rerolling it to measure the yardage remaining for inventory purposes.

The device will save labor, time and will enable the salesman to utilize the space usually retained for measuring the roll at inventory time.

Another object of the invention is the provision of a mechanism which will measure and print upon a web of material the yardage of material which has passed through the mechanism.

With these and other objects and advantages in view, the invention consists of the novel details of construction, arrangement and combination of parts more fully hereinafter described, claimed and illustrated in the accompanying drawings, in which:

Figure 1 is an elevational view of an embodiment of the invention;

Figure 2 is a vertical longitudinal sectional view thereof;

Figure 3 is an enlarged fragmentary view of the indicating mechanism;

Figure 4 is a top plan view on the line 4—4 of Figure 2 partly broken away to show the indicating mechanism;

Figure 5 is an end view;

Figure 6 is a sectional view on the line 6—6 of Figure 1;

Figure 7 is an enlarged detailed sectional view of the pressure roller, and

Figure 8 is a sectional view on the line 8—8 of Figure 2.

Referring more in detail to the drawings, the reference numeral 10 indicates the surface on which the material is to be rolled which may be a table top or a platform of any desired shape or size. Secured to the longitudinal sides of the surface 10 by means of bolts 12 are the triangular shaped uprights 14 which are provided with bearings 16 in which the stub shafts 18 are journalled.

Mounted on the shafts 18 is the hollow roller or cylinder 20 which is provided with the recess or slot 22 which permits access to the printing wheel 24 on which the numerals 26 are formed. This is a wheel in which the numerals are type numerals which upon contact with a surface will print thereon the number contacted.

Co-acting with the printing wheel 24 and revolving in unison therewith is a ratchet wheel 28 having a hub 30 which is fixed to a shaft 32. The printing wheel 24 is likewise secured to the shaft 32, and the wheel 24 and wheel 28 are so positioned that the numerals carried thereby are positioned midway of the ratchet teeth 34 and extend beyond the periphery thereof.

The shaft 32 is journalled in bearings 36 secured on the inside of the roller 20 and the shaft extends transversely of the roller and is so positioned that when in printing position the numerals 26 extend through and beyond the recess or slot 22.

An ink roller 38 is mounted on a shaft 40, which parallels the shaft 32, and is journalled in bearings 42 secured to the inside of the roller 20. The roller 38 supplies ink to the numerals 26 from an ink plate 44 which is mounted on a shaft 46 parallel to shafts 32 and 40 and journalled in bearings 48 secured to the inside of the roller 20.

Rotation is imparted to the ratchet wheel 28 by means of the trip lever 50 having the dog or pawl 52 pivoted on the inner end thereof which is maintained in operative position by the spring 54.

The lever 50 is mounted for reciprocal movement through the end of the roller 20 by means of an inclined arm 56 having the slot 58 therein which rides on the shaft 60 which is secured to the inner sides of the roller by means of sockets 62 and is parallel to the shafts previously described. A slot 64 in the end of the roller maintains the lever 50 in horizontal operating position so that the dog 52 and wheel 28 will co-act when the lever is moved inwardly.

Movement of the lever 50 is caused by a circular trackway 66 secured to the inner side of one of the uprights 14 which has the inclined dog 68 formed thereon. As the roller 20 rotates by means of the material to be measured being passed thereover the roller 70 mounted in the forked end 72 of the lever 50 contacts a node 68 having an inclined surface and is forced to ride thereover, thereby causing the lever to move inwardly and rotate the wheel 28 in a step by step motion. A spring 74 secured to the arm 56 of the lever 50 and the end of the roller 20 forces the roller 70 into constant contact with the trackway 66 at all times.

Secured to the top of the upright 14 by bolts 76 is the L-shaped supporting bracket 78 having the depending L-shaped brackets 80 which are provided with slots 82 in which the ears 84 of the L-shaped bearings 86 are mounted.

A shaft 88 journalled in the bearing 86 has the pressure roller 90 secured thereto and pressure is maintained on the roller 90 by means of oppositely positioned springs 92 which are mounted intermediate the feet 94 of the bracket 80 and the feet 96 of the bearings 86. Therefore, when the material is passed between the rollers 20 and 90 close contact of the material will be maintained.

In operation of the indicator, the material to be measured is inserted between the rollers as previously described and the friction created between the material and the roller 20 causes the roller to be rotated as the material is drawn therebetween. Burlap or other friction creating materials may be secured to the outer surface of the roller to increase the friction.

As the roller 20 rotates, the roller 70 carried by the lever 50 mounted in the roller 20 travels over the trackway 66. When it contacts the node 68 it will cause the lever 50 to move inwardly and engage the ratchet wheel 28 for the rotation of the wheel 28 which in turn will actuate the wheel 24 as previously described. The numerals 26 are positioned intermediate of the teeth 34 so that a half turn or step of the wheel 28 brings the numerals 26 into printing position and the pressure of the roller 90 will cause the numerals to print on the under-surface of the material, the full and complete turn will carry the numeral out of contact with the material so that there is no further contact with the material until the next numeral 26 is in position. This will continue until the roll of material has been exhausted.

Depending on the width of the material, the printed numerals thereon will also permit computation of the square yards contained therein depending on the width of the material.

It is believed that the operation of the invention will be clear to those skilled in the art and it will be evident that the embodiment of the invention herein described and illustrated will accomplish the objects of the invention.

It is to be further understood that minor changes in the details, construction and combination of the various parts may be resorted to provided they fall within the spirit of the invention or the scope of the appended claims.

Having thus described the invention, what is claimed as new and desired to be secured by Letters Patent is:

1. A device of the character described comprising a pair of supports one of which is provided with a node having an inclined surface on its inner face, a hollow roller having a slot therein and revolubly mounted in said supports and adapted to be rotated by frictional contact with a web of material passing thereover, a shaft mounted within the roller, a printing wheel carrying type on its periphery mounted on the shaft in such manner that one character of type will protrude through the slot at all times, a ratchet wheel attached to the printing wheel likewise mounted on the shaft, a reciprocating lever mounted in the roll and protruding through one end thereof, a pawl carried on the inner end of the reciprocating lever and positioned to engage the ratchet wheel, a roller carried on the outer end of said lever, means resiliently urging the said lever outwardly of the hollow roller with the roller on the end thereof in engagement with the inner face of the support having the node on its inner face whereby the roller rides over said node when the hollow roller is rotated, thereby causing a step-by-step movement of the printing wheel whereby the web passing over the said hollow roller is printed at intervals with consecutive markings.

2. A length marker for roll material comprising a cylinder having a slot in the peripheral surface and another slot in one end thereof, means rotatably supporting said cylinder, a printing wheel having type on the peripheral surface positioned in said cylinder, a transversely disposed shaft on which the printing wheel is carried journaled in said cylinder with the type of the printing wheel protruding through the slot in the peripheral surface of said cylinder, a ratchet wheel on the printing wheel shaft, a lever slidably supported by and mounted in one end of the cylinder and extended through the slot in the end thereof with the inner end of the lever positioned to engage the said ratchet wheel, means within the cylinder urging the said lever outwardly, means outside of the cylinder sliding the said lever inwardly of the cylinder to actuate the printing wheel through the ratchet wheel with each revolution of the cylinder, a pressure roller parallel to the cylinder and positioned to urge material into contact with type of the printing wheel extended through the slot in the peripheral surface of the cylinder, and means resiliently urging the said pressure roller against the surface of the cylinder and type.

CLINTON TROSPER.

REFERENCES CITED

The following references are of record in the file of this patent:

UNITED STATES PATENTS

| Number | Name | Date |
| --- | --- | --- |
| 209,647 | Brady | Nov. 5, 1878 |
| 273,189 | Tatham | Feb. 27, 1883 |
| 498,765 | Chevron | June 6, 1893 |
| 594,530 | Hotz | Nov. 30, 1897 |
| 895,079 | Eigner | Aug. 4, 1908 |
| 1,309,306 | Schulstad | July 8, 1919 |
| 1,713,070 | Bohnengel | May 14, 1929 |

FOREIGN PATENTS

| Number | Country | Date |
| --- | --- | --- |
| 360,051 | Great Britain | Nov. 5, 1931 |